United States Patent
Takayanagi et al.

(10) Patent No.: US 10,647,892 B2
(45) Date of Patent: May 12, 2020

(54) ADHESIVE AND STRUCTURE, AND ADHESION METHOD

(71) Applicants: MITSUBISHI HEAVY INDUSTRIES, LTD., Tokyo (JP); AKITA UNIVERSITY, Akita-shi (JP); TSUCHIYA CO., LTD., Nagoya-shi, Aichi (JP)

(72) Inventors: Toshiyuki Takayanagi, Tokyo (JP); Naomoto Ishikawa, Tokyo (JP); Hideki Horizono, Tokyo (JP); Nobuyuki Kamihara, Tokyo (JP); Mikio Muraoka, Akita (JP); Hiroaki Hayashi, Aichi (JP); Osamu Yoshida, Aichi (JP); Kotaro Tsuji, Aichi (JP)

(73) Assignees: MITSUBISHI HEAVY INDUSTRIES, LTD., Tokyo (JP); AKITA UNIVERSITY, Akita-Shi, Akita (JP); TSUCHIYA CO., LTD., Nagoya-Shi, Aichi (JP)

( * ) Notice: Subject to any disclaimer, the term of this patent is extended or adjusted under 35 U.S.C. 154(b) by 55 days.

(21) Appl. No.: 15/548,655

(22) PCT Filed: Feb. 9, 2016

(86) PCT No.: PCT/JP2016/053872
§ 371 (c)(1),
(2) Date: Aug. 3, 2017

(87) PCT Pub. No.: WO2016/129610
PCT Pub. Date: Aug. 18, 2016

(65) Prior Publication Data
US 2018/0016473 A1 Jan. 18, 2018

(30) Foreign Application Priority Data
Feb. 9, 2015 (JP) .................... 2015-023098

(51) Int. Cl.
*C09J 11/04* (2006.01)
*B29C 65/00* (2006.01)
(Continued)

(52) U.S. Cl.
CPC ............ *C09J 11/04* (2013.01); *B29C 65/148* (2013.01); *B29C 65/1425* (2013.01);
(Continued)

(58) Field of Classification Search
None
See application file for complete search history.

(56) References Cited

U.S. PATENT DOCUMENTS 9,823,796 B2 * 11/2017 Wang .................. G06F 3/044
2003/0168640 A1 * 9/2003 Kirsten ................. B29C 35/08
252/500

(Continued)

FOREIGN PATENT DOCUMENTS

EP 2014734 A1 1/2009
JP H02-166181 A 6/1990
(Continued)

OTHER PUBLICATIONS

Europe Patent Office, "Search Report for European Patent Application No. 16749254.5," dated Sep. 26, 2018.
(Continued)

*Primary Examiner* — Satya B Sastri
(74) *Attorney, Agent, or Firm* — Manabu Kanesaka; Kenneth Berner; Benjamin Hauptman

(57) ABSTRACT

Provided is an adhesive that can provide quick bonding between thermoplastic resins and excellent bond strength, a structure having adhesion provided by the adhesive, and an adhesion method using the adhesive. The adhesive bonds a first member (11) containing a thermoplastic resin or a carbon fiber reinforced thermoplastic resin and a second member (12) containing the thermoplastic resin or the carbon fiber reinforced thermoplastic resin. The adhesive includes a thermoplastic resin as a main component containing a metal nano material that absorbs electromagnetic waves and generates heat.

7 Claims, 3 Drawing Sheets

(51) Int. Cl.

| | | |
|---|---|---|
| *C09J 201/00* | (2006.01) | |
| *C08K 3/08* | (2006.01) | |
| *B32B 27/28* | (2006.01) | |
| *C09J 7/10* | (2018.01) | |
| *B32B 5/26* | (2006.01) | |
| *B29C 65/50* | (2006.01) | |
| *B32B 27/08* | (2006.01) | |
| *B29C 65/14* | (2006.01) | |
| *B29C 65/34* | (2006.01) | |
| *B29C 65/48* | (2006.01) | |
| *B32B 7/12* | (2006.01) | |
| *B29C 65/36* | (2006.01) | |
| *C09J 5/06* | (2006.01) | |
| *C08K 3/10* | (2018.01) | |
| *B29K 105/16* | (2006.01) | |
| *C08K 7/06* | (2006.01) | |

(52) U.S. Cl.
CPC ........ *B29C 65/348* (2013.01); *B29C 65/3412* (2013.01); *B29C 65/3416* (2013.01); *B29C 65/3468* (2013.01); *B29C 65/3676* (2013.01); *B29C 65/481* (2013.01); *B29C 65/489* (2013.01); *B29C 65/4815* (2013.01); *B29C 65/5057* (2013.01); *B29C 66/1122* (2013.01); *B29C 66/43* (2013.01); *B29C 66/7212* (2013.01); *B29C 66/73921* (2013.01); *B29C 66/91951* (2013.01); *B32B 5/26* (2013.01); *B32B 7/12* (2013.01); *B32B 27/08* (2013.01); *B32B 27/28* (2013.01); *B32B 27/288* (2013.01); *C09J 5/06* (2013.01); *C09J 7/10* (2018.01); *C09J 201/00* (2013.01); *B29C 65/368* (2013.01); *B29C 65/3612* (2013.01); *B29C 65/3616* (2013.01); *B29C 65/488* (2013.01); *B29C 65/5014* (2013.01); *B29C 66/71* (2013.01); *B29C 66/712* (2013.01); *B29K 2105/162* (2013.01); *B32B 2260/021* (2013.01); *B32B 2260/046* (2013.01); *B32B 2262/103* (2013.01); *B32B 2262/106* (2013.01); *B32B 2603/00* (2013.01); *B32B 2605/18* (2013.01); *C08K 3/08* (2013.01); *C08K 3/10* (2013.01); *C08K 7/06* (2013.01); *C08K 2003/0831* (2013.01); *C08K 2201/005* (2013.01); *C09J 2205/102* (2013.01); *C09J 2205/31* (2013.01); *C09J 2471/006* (2013.01); *C09J 2481/006* (2013.01)

(56) References Cited

U.S. PATENT DOCUMENTS

| | | | |
|---|---|---|---|
| 2004/0091694 A1* | 5/2004 | Holzer | B29C 35/0272 428/323 |
| 2005/0039848 A1 | 2/2005 | Kirsten | |
| 2005/0252607 A1 | 11/2005 | Kirsten et al. | |
| 2009/0056865 A1* | 3/2009 | Kubota | B29C 35/02 156/247 |
| 2011/0284691 A1 | 11/2011 | Wlach (Metzech) et al. | |
| 2012/0021225 A1* | 1/2012 | Maekawa | B32B 15/04 428/412 |
| 2014/0057098 A1 | 2/2014 | Maekawa et al. | |

FOREIGN PATENT DOCUMENTS

| | | |
|---|---|---|
| JP | H09-239844 A | 9/1997 |
| JP | H09-241508 A | 9/1997 |
| JP | H10-315335 A | 12/1998 |
| JP | 2004-506065 A | 2/2004 |
| JP | 2008-156510 A | 7/2008 |
| JP | 2011-093297 A | 5/2011 |
| JP | 2012-518687 A | 8/2012 |

OTHER PUBLICATIONS

PCT/ISA/210, "International Search Report for International Application No. PCT/JP2016/053872," dated May 17, 2016.

PCT/ISA/237 "Written Opinion of the International Searching Authority for International Application No. PCT/JP2016/053872," dated May 17, 2016.

* cited by examiner

ADHESIVE AND STRUCTURE, AND ADHESION METHOD

RELATED APPLICATIONS

The present application is National Phase of International Application No. PCT/JP2016/053872 filed Feb. 9, 2016, and claims priority from Japanese Application No. 2015-023098, filed Feb. 9, 2015, the disclosure of which is hereby incorporated by reference herein in its entirety.

TECHNICAL FIELD

The present invention relates to an adhesive, a structure using the adhesive, and an adhesion method using the adhesive, particularly to an adhesive for bonding between thermoplastic resins.

BACKGROUND ART

Resins reinforced with carbon fibers (carbon fiber reinforced plastics) are materials having light weight, high strength, and high elasticity. Carbon fiber reinforced plastics are applied to aircraft members and wind turbine blades, for example. Examples of carbon fiber reinforced plastics include matrixes of thermosetting resins (carbon fiber reinforced thermosetting plastics: CFRPs) and matrixes of thermoplastic resins (carbon fiber reinforced thermoplastics: CFRTPs). CFRTPs have an advantage in that they need a shorter molding time than CFRPs (high-cycle performance).

An aircraft member, for example, includes a portion where CFRTP members are bonded to each other, a portion where a CFRTP member and a thermoplastic-resin member are bonded to each other, or a portion where thermoplastic-resin members are bonded to each other. In order to take advantage of the high-cycle performance of CFRTPs, an adhesion technique for quickly bonding members is required.

Typical adhesives are mainly composed of thermosetting resins. An adhesive mainly composed of a thermosetting resin needs to be heated for use. However, for bonding between thermoplastic resins with the adhesive, the thermoplastic resins cannot be heated to the curing temperature of the thermosetting resin; thus, adequate adhesive strength cannot be ensured.

Another adhesion technique uses microwave induction heating. In this technique, a magnetic substance (e.g., ferrite) serving as a microwave heating element is mixed to the adhesive and the adhesive is cured using heat generated by the microwave heating element upon irradiation of the adhesive with microwaves.

PTL 1 uses an adhesive containing a filler made of carbon black or SiC. PTL 1 discloses a method of bonding two adherends by irradiating the adhesive with microwaves, so that the filler generates heat and the adhesive is cured.

Ultrasonic bonding is under study as a novel adhesion technique. In ultrasonic bonding, an adhesive containing an energy director is protrudingly attached to a portion of one resin member to be bonded, and the one resin member is then brought into contact with another resin member with the adhesive-applied portion facing downward. When the portion to be bonded is irradiated with ultrasonic waves from above the members, the energy director generates heat upon reception of ultrasonic waves and the adhesive melts, thereby bonding the members.

CITATION LIST

Patent Literature

{PTL 1}
Japanese Unexamined Patent Application, Publication No. 2008-156510

SUMMARY OF INVENTION

Technical Problem

In this ultrasonic bonding, the adhesive needs to be applied in the form of protrusion and should stay attached to the member even when facing downward, which complicates the step of applying the adhesive. The adhesive is in the form of protrusion, causing a problem in that a space or the like easily occurs between two members made in contact with each other, resulting in a reduction in adhesion accuracy. Another problem occurs in that ultrasonic waves damage the members.

In the case of bonding between carbon fiber reinforced plastics using the method according to PTL 1, carbon fiber reinforced plastics all contain a large amount of carbon. Accordingly, irradiation with microwaves heats not only the adhesive but also the adherends, thereby causing problems of preclusion of proper adhesion and damage in the adherends.

It is an object of the present invention, which has been made to solve the aforementioned problems, to provide an adhesive that can provide quick bonding between thermoplastic resins and excellent bond strength, a structure having adhesion provided by the adhesive, and an adhesion method using the adhesive.

Solution to Problem

The first aspect of the present invention is an adhesive for bonding between a first member containing a thermoplastic resin or a carbon fiber reinforced thermoplastic resin and a second member containing the thermoplastic resin or the carbon fiber reinforced thermoplastic resin. The adhesive includes a thermoplastic resin as a main component containing a metal nano material that absorbs electromagnetic waves and generates heat.

Upon irradiation of the adhesive with electromagnetic waves, the metal nano material absorbs electromagnetic waves and generates heat. This heat heats the thermoplastic resin serving as the main component and melts the thermoplastic resin, thereby forming an adhesive layer. Consequently, adequate bond strength can be provided for bonding between the members containing the thermoplastic resins.

The present invention uses a metal nano material composed of different materials from the first member and the second member, the metal nano material having a high electromagnetic wave absorption efficiency, so that irradiation with electromagnetic waves provides high heating efficiency and quick bonding, thereby providing an advantage in preventing damage in the members.

In the first aspect, the nano material is preferably nanofibers or nanocoils. The nano material in the aforementioned shape, in particular, has an advantage in its high electromagnetic wave absorption efficiency.

In the first aspect, the electromagnetic waves are preferably 3 MHz or more and 3 GHz or less. The nano material of this aspect has a high absorption efficiency of electromagnetic waves in the aforementioned frequency. Electromagnetic waves in the aforementioned range do not need special management, so that electromagnetic wave irradiation can be performed using a simple apparatus.

In the first aspect, the metal is preferably platinum or gold.

Even if a process of manufacturing the metal nano material is performed in an oxidizing atmosphere, platinum or gold is resistant to oxidization, and an oxide has electric conductivity. Thus, a nano material having a high electromagnetic wave absorption efficiency can be manufactured.

In the first aspect, the amount of the nano material added to the main component is preferably 30 μg/cm² or less. Since the metal nano material has a high electromagnetic wave absorption efficiency, even such a slight addition amount is enough to heat the thermoplastic resin. A large addition amount of nano material causes a crack in the adhesive layer after bonding. The adhesive of this aspect can suppress the occurrence of crack and improve the fatigue resistance of the bonded members.

The second aspect of the present invention is a structure comprising the first member and the second member bonded to each other with the adhesive according to the first aspect.

Since this aspect forms an adhesive layer with adequate bond strength, the structure has high strength. Since the occurrence of crack in the adhesive layer is suppressed, the structure is highly resistant to fatigue.

In the second aspect, the thermoplastic resin in the adhesive and the thermoplastic resin in at least one of the first member and the second member are preferably the same material.

This yields higher bond strength.

The third aspect of the present invention is an adhesion method including the steps of: placing the adhesive according to the first aspect in a portion of the first member to be bonded; placing the second member on the adhesive; and irradiating the adhesive with the electromagnetic waves to bond the first member and the second member with the adhesive.

This aspect allows a structure with high bond strength and durability to be quickly fabricated in a simple process.

Advantageous Effects of Invention

The present invention allows members composed of a thermoplastic resin or a carbon fiber reinforced thermoplastic resin to be quickly bonded to each other without being damaged. The use of the adhesive of the present invention yields adequate bond strength, thereby providing a high-strength structure.

DESCRIPTION OF EMBODIMENTS

Figure 1:
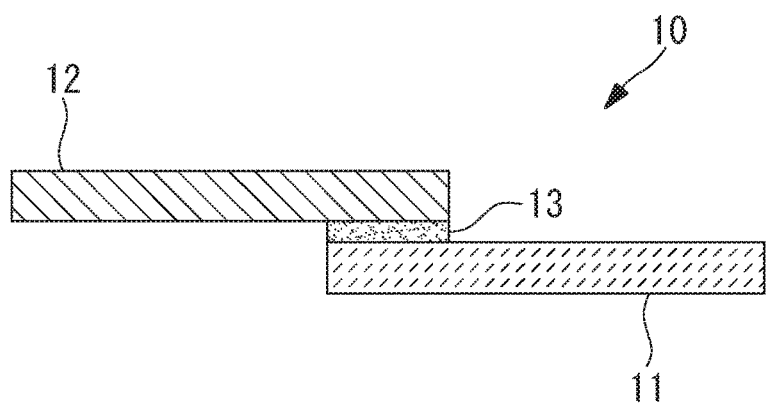
FIG. 1 is a schematic view of a structure according to one embodiment of the present invention.

FIG. 1 is a schematic view of a bonding portion of a structure according to one embodiment of the present invention. A structure 10 has a first member 11 and a second member 12 overlapped each other and bonded to each other at the overlap through an adhesive layer 13. To be specific, the structure 10 is an aircraft, a wind turbine blade, or the like.

The first member 11 and the second member 12 are composed of thermoplastic resins or carbon fiber reinforced thermoplastics (CFRTPs).

In other words, the first member 11 and the second member 12 are a combination of members of thermoplastic resins, members of CFRTPs, or a member of a thermoplastic resin and a member of a CFRTP. Taking an aircraft as an example, the first member 11 and the second member 12 are a skin and a stringer, a floor beam and a bracket, or the like.

The adhesive layer 13 is made of an adhesive mainly composed of a thermoplastic resin containing a metal nanomaterial that absorbs electromagnetic waves and generates heat.

Examples of a thermoplastic resin serving as the main component of the adhesive include polyether ether ketone (PEEK), polyethylene terephthalate (PET), polybutylene terephthalate (PBT), nylon 6 (PA6), nylon 66 (PA66), polyphenylene sulfide (PPS), polyetherimide (PEI), and polyetherketoneketone (PEKK). It is preferable that the main component be the same as the materials for the first member 11 and the second member 12 to provide excellent bond strength of the adhesive layer 13. If the first member 11 and the second member 12 are composed of different thermoplastic resins, the adhesive is preferably composed of the same material as one of the first member 11 and the second member 12.

A "nano material" refers to a material having a nano-scale two-dimensional or three-dimensional size (one to several hundred nanometers). To be specific, a nano material is, for example, a nanofiber (which has a nano-scale cross-sectional diameter), a nanocoil (which has a nano-scale cross-sectional diameter and is formed in a coil form in the longitudinal direction), nanoparticles (which have a nano-scale grain size), a nanotube (which is a hollow fiber having a nano-scale cross-sectional diameter), or the like. Nanocoils and nanofibers are particularly preferable as they have a high electromagnetic wave absorption efficiency.

When a large amount of nano material is added to the main component, a crack occurs in the adhesive layer 13 during use. For this reason, the amount of nano material added to the main component is 0.1 mg/cm² or less, preferably 30 μg/cm² or less in mass per adhesive unit area. This nano material, which has a high electromagnetic wave absorption efficiency, yields a large calorific value even at a low addition amount. Meanwhile, considering easy management of the addition amount, dispersion of the nano material, the calorific value, and the like, the lower limit of the addition amount is preferably 0.1 μg/cm².

Although any metal can be used, a preferred metal has a high electromagnetic wave absorption efficiency at the frequency of electromagnetic waves which the metal is irradiated with. Specific examples are Pt, Au, Ni, and Cu.

The metal is oxidized in a step of forming nanocoils or nanofiber described later. Pt and Au, which are resistant to oxidization, have electrical conductivity even when they are oxidized; thus, Pt and Au are most suitable for nano materials.

A metal nanofiber is fabricated by the electrospinning method.

A metal acetate is dissolved in a polymer solution (e.g., a polyvinyl alcohol aqueous solution). The obtained solution is sprayed onto a substrate by the electrospinning method, thereby forming nanofibers containing a metal. The obtained nanofibers are subjected to heat treatment in a reduced atmosphere, thus producing metal nanofibers.

Metal nanocoils are obtained by forming metal thin films on the surface of nanofibers as core members, the nanofibers being fabricated by the electrospinning method. In this case, the core members may be composed of a metal or polymer. The nanocoils may be solid or hollow. An example method of forming hollow nanocoils uses a polymer core member which is provided with a metal thin film formed thereon and then subjected to heat treatment for vaporization of the polymer.

The adhesive may be in the liquid state or a sheet form (having a thickness of about 150 μm). An adhesive in a sheet form is easily applicable to the members and the thickness of the adhesive layer 13 can be made generally uniform.

A method of bonding the first member 11 and the second member 12 with the adhesive of this embodiment will now be explained.

A predetermined amount of aforementioned adhesive is applied to a portion of the first member 11 to be bonded. To use the adhesive in a sheet form, it is cut into a predetermined size of adhesive sheet and then placed on the first member 11. A portion of the second member 12 to be bonded is brought into contact with the adhesive on the first member 11, and the second member 12 is placed on the first member 11.

The first member 11 and the second member 12 are overlapped each other, and the adhesive is irradiated with electromagnetic waves. The electromagnetic waves may have any frequency but are preferably not electromagnetic waves, such as X-rays, which require special management. They are preferably electromagnetic waves having a frequency that the metal in the nano material absorbs at a high absorption efficiency. Considering this, preferred is irradiation with high frequency (HF, 3 MHz or more and 30 MHz or less), very high frequency (VHF, 30 MHz or more and 300 MHz or less), or ultrahigh frequency (300 MHz or more and 3 GHz or less). To be specific, electromagnetic waves in the ISM band can be used.

Electromagnetic waves for irradiation are required to be able to pass through the first member 11 and the second member 12; thus, an appropriate frequency of electromagnetic waves is selected.

Figure 2:
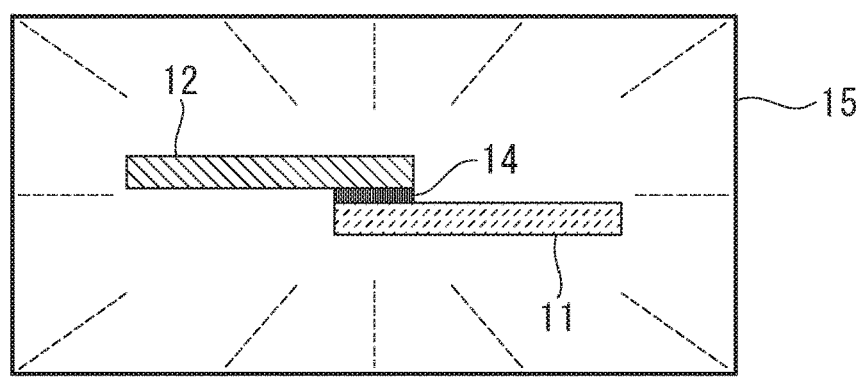
FIG. 2 is a schematic view for explaining a method of irradiation with electromagnetic waves.

FIG. 2 is a schematic view for explaining a method of irradiation with electromagnetic waves. In the method shown in FIG. 2, a member composed of the first member 11 and the second member 12 overlapped through the adhesive 14 is accommodated in a chamber 15. Upon irradiation of the member with electromagnetic waves in the chamber 15, the electromagnetic waves reach the adhesive 14. The nano material (metal nanocoils or metal nanofibers) in the adhesive 14 absorbs electromagnetic waves and generates heat. The heat generated by the nano material heats and melts the main component (thermoplastic resin). When the electromagnetic waves are blocked, the adhesive is cooled, thereby forming an adhesive layer.

Figure 3:
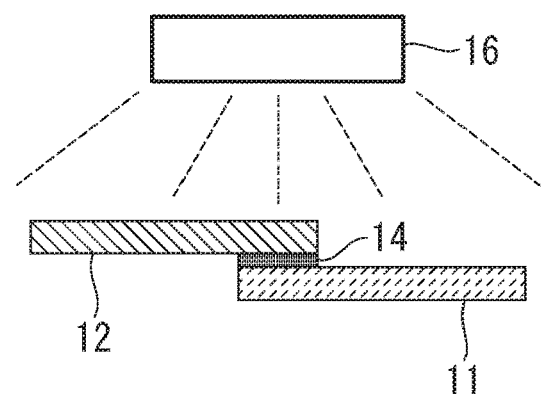
FIG. 3 is a schematic view for explaining another method of irradiation with electromagnetic waves.

FIG. 3 is a schematic view for explaining another method of irradiation with electromagnetic waves. In the method shown in FIG. 3, an irradiator 16 is provided above the adhesive 14 between the members. At this time, the center of the area to which the adhesive 14 is applied generally coincides with the center of the irradiator 16. In the method shown in FIG. 3, the members do not need to be accommodated in a container such as a chamber. When the irradiator 16 is operated to irradiate the members with electromagnetic waves from the irradiator 16, electromagnetic waves are absorbed in the nano material and the nano material generates heat as described above, so that the main component of the adhesive 14 melts. Subsequently, stopping the irradiator 16 blocks the electromagnetic waves, thereby cooling the adhesive and forming an adhesive layer.

The irradiance and irradiation time of electromagnetic waves are set such that the main component melts and the shape during adhesive application or the sheet shape is maintained so that it cannot flow into the portions other than the portions to be bonded.

Example 1

As a sample of this example, prepared was a PPS resin substrate (produced by TORAY industries, Inc., model number: A900, 10 mm high×10 mm wide×2 mm thick) with Pt nanocoils (solid coils with a diameter of 250 nm and a coil pitch of 3.2 μm) placed thereon. The substrate was placed on an electronic scale, and the Pt nanocoils were placed on the substrate. This measurement result showed that the value was below the lower measurement limit (0.1 mg). Accordingly, the amount of Pt nanocoils on the substrate was below 0.1 mg/cm$^2$.

As a sample of a comparative example, prepared was a PPS resin (produced by TORAY industries, Inc., model number: A900) containing 60 wt % (1.3 g/cm$^3$) of a NiZn-based ferrite (produced by JFE Chemical Corporation, model number: JN-350) mixed thereinto, molded on a substrate of 10 mm high×10 mm wide×2 mm thick. It should be noted that the ferrite material is a material traditionally known to exhibit high electromagnetic wave absorption efficiency.

Figure 4:
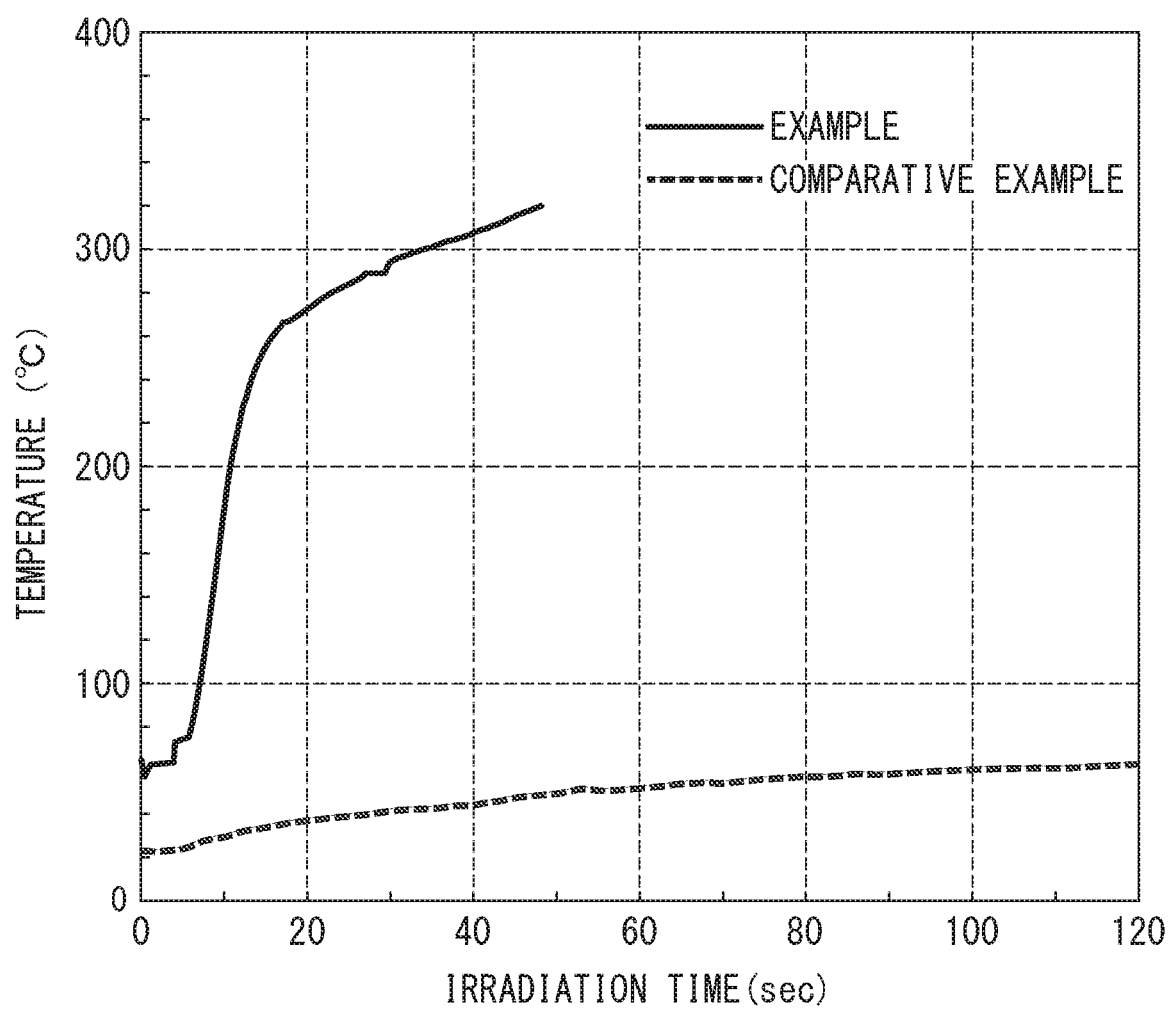
FIG. 4 is a graph showing variations in the temperatures of the substrates of Example 1 and a comparative example with time.

Each substrate was irradiated with microwaves (2.45 GHz, 20 W) from above, and variations in the temperature of the substrate surfaces with time were measured using an infrared thermography. FIG. 4 shows the results.

In this example, the temperature sharply increased within about 20 seconds from the initiation of the irradiation. Then, the rate of increase in temperature decreased. The temperature reached 282.2° C. in 20 seconds from the initiation of the irradiation, and then 300° C. in about 33 seconds. The melting point of a PPS resin is about 280° C. Hence, the method of this example enabled heating to above the melting point of the PPS resin.

In the comparative example, the temperature gradually increased from the initiation of the irradiation and reached 72.2° C. in five minutes. In the comparative example, the temperature does not reach the melting point of the PPS resin and thus cannot melt the PPS resin. In other words, the members cannot be bonded to each other with the PPS resin.

For this reason, Pt nanocoils can be said to be a material having a very high electromagnetic wave absorption efficiency compared with ferrite. For this reason, it can be said that the use of only a slight amount of Pt nanocoils can melt the PPS resin and bond the members to each other, thereby providing adequate bond strength.

Example 2

As a sample, prepared was a polyether ether ketone (=PEEK) resin substrate (produced by Victrex Japan, Inc., model number: 450G, 10 mm high×10 mm wide×3 mm thick) with Pt nanocoils (solid coils with a diameter of 250 nm and a coil pitch of 3.2 μm) placed thereon.

Here, the amounts of nano materials placed thereon were 7.2 μg/cm$^2$, 12 μg/cm$^2$, and 24 μg/cm$^2$.

Figure 5:
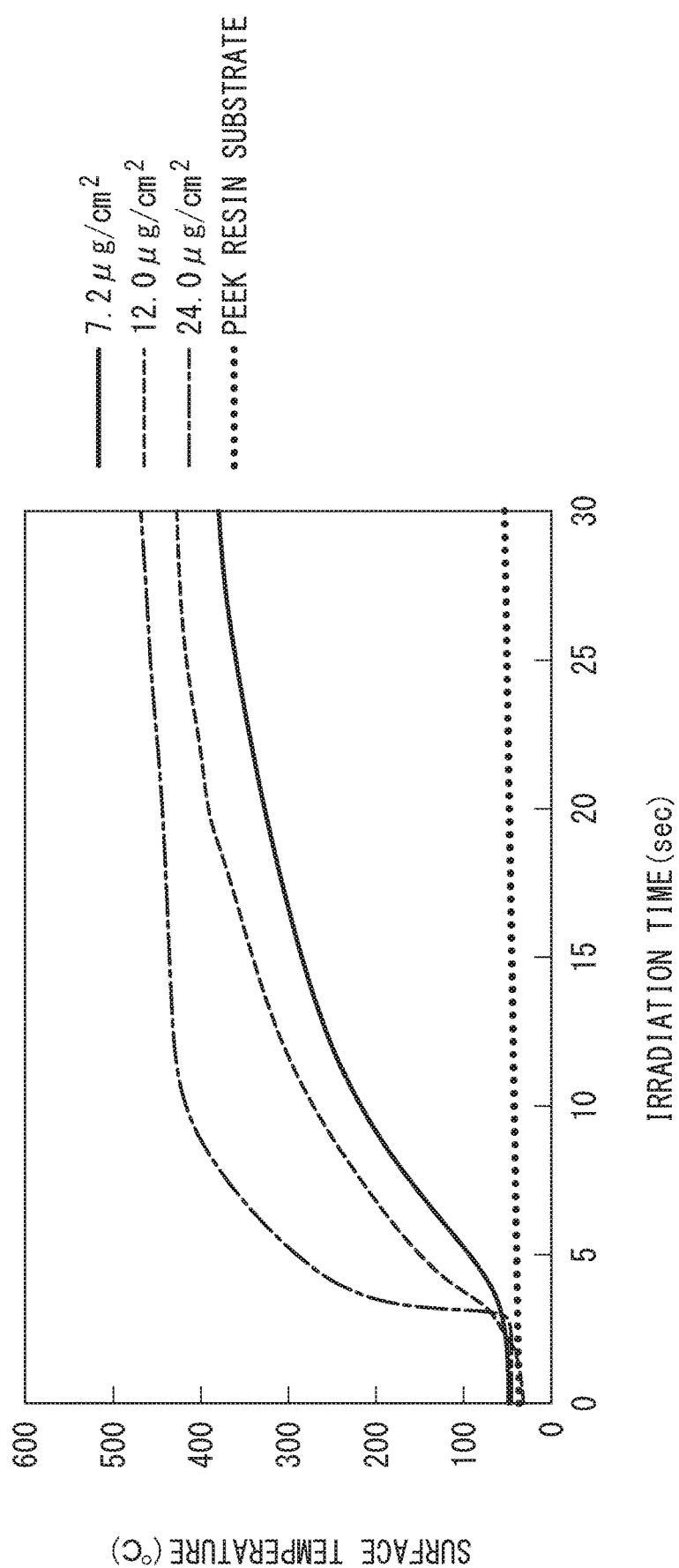
FIG. 5 is a graph showing the amounts of nano material in a main component and variations in the temperatures of the substrates with time.

As a sample of a comparative example, the same polyetheretherketone resin substrate as in the aforementioned example was prepared and was irradiated with microwaves from above without Pt nanocoils placed thereon as in the aforementioned example. Variations in the temperature of the substrate surfaces with time were measured using an infrared thermography. FIG. 5 shows the results.

The surface temperature of the sample without a nano material placed thereon (the PEEK resin substrate) barely increased. In contrast, as the amount of nano material placed thereon increased, the surface temperature of the substrate increased. The melting point of the PEEK resin is in the range of about 340 to 380° C. In other words, any method of this example enabled heating to above the melting point of the PEEK resin. In reality, any PEEK resin substrate with the nano material of this example placed thereon had the melting of the substrate surface. Referring to FIG. 5, even small amounts of 30 μg/cm² or less of nano material placed thereon obtained large calorific values.

REFERENCE SIGNS LIST 10 structure
11 first member
12 second member
13 adhesive layer
14 adhesive
15 chamber
16 irradiator

The invention claimed is:

1. An adhesive for bonding between a first member containing a thermoplastic resin or a carbon fiber reinforced thermoplastic resin and a second member containing the thermoplastic resin or the carbon fiber reinforced thermoplastic resin, the adhesive comprising:

a thermoplastic resin containing a metal nano material that absorbs electromagnetic waves and generates heat, wherein the nano material is nanocoils.

2. The adhesive according to claim 1, wherein a frequency of the electromagnetic waves is 3 MHz or more and 3 GHz or less.

3. The adhesive according to claim 1, wherein the metal is platinum or gold.

4. The adhesive according to claim 1, wherein the adhesive is in a sheet form, and the amount of the nano material added to the thermoplastic resin is 30 μg/cm² or less.

5. A structure comprising the first member and the second member bonded to each other with the adhesive according to claim 1.

6. The structure according to claim 5, wherein the thermoplastic resin in the adhesive and the thermoplastic resin in at least one of the first member and the second member are the same material.

7. An adhesion method comprising the steps of:

placing the adhesive according to claim 1 in a portion of the first member to be bonded;

placing the second member on the adhesive; and irradiating the adhesive with the electromagnetic waves to bond the first member and the second member with the adhesive.

* * * * *